Dec. 2, 1969          J. A. KAYSER              3,481,159
      UNIVERSAL JOINT WITH ELASTOMERIC BEARING RACE MOUNTING
                      AND A TWO PART YOKE
Filed April 19, 1968                          2 Sheets-Sheet 1

INVENTOR.
JOHN A. KAYSER

BY

ATTORNEY

INVENTOR.
JOHN A. KAYSER

BY *Richards B Farley*

ATTORNEY

United States Patent Office 3,481,159
Patented Dec. 2, 1969

3,481,159
UNIVERSAL JOINT WITH ELASTOMERIC BEARING RACE MOUNTING AND A TWO PART YOKE
John A. Kayser, Oregon, Ohio, assignor to Dana Corporation, Toledo, Ohio, a corporation of Virginia
Filed Apr. 19, 1968, Ser. No. 722,750
Int. Cl. F16d 3/28
U.S. Cl. 64—17   14 Claims

ABSTRACT OF THE DISCLOSURE

The invention comprises the novel assembly of a bearing race of a Cardan-type universal joint to its yoke arm member wherein a urethane ring is positioned in an annular groove around the exterior of the bearing race member so as to be both compressed and expanded between it and the opening in the yoke, to limit, to a great degree, problems of misalignment and requirements of close manufacturing tolerances for the mating parts of the assembly.

---

Figure 1:
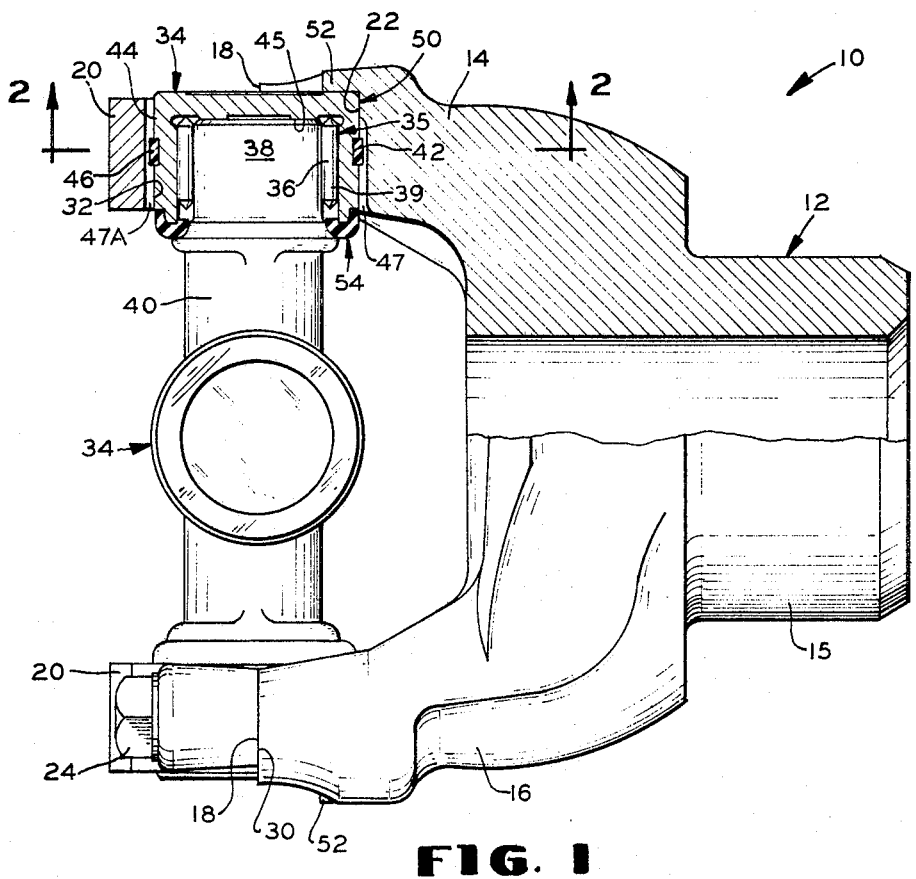

This invention relates to universal joints in general, and more particularly, to a Cardan-type universal joint having an improved structure for securing the bearing race members to the joint member carrying the same.

In the usual construction of a Cardan-type universal joint there are a pair of rotatable members disposed in an end-to-end relationship. The adjacent ends of each of the rotatable members are provided with a pair of yoke arm extensions which are connected together in a torque transmitting relationship by means of a journal cross member. The journal cross member includes four radially extending journal cross arms to provide the torque transmitting connection, with each of the journal cross arms connected to one of the respective yoke arms so as to provide angular displacement of the axes of the respective rotatable members relative to each other during torque transmission.

In order to provide relatively frictionless relative movement between each journal cross arm and its respective yoke arm, a cup shaped bearing race is positioned over the trunnion of each journal cross arm and is received in openings of the extensions of the yoke arms. The fit between the yoke arm, whether a solid or a two piece yoke arm, and its cup shaped bearing race must be a closely controlled tolerance fit to preclude too tight a fit and crushing or flattening of the bearing race and consequent improper or no rotation of the needle bearings relative to the trunnion or too loose a fit and rotation of the cup shaped bearing race relative to the yoke arm after assembly. Either of these deficiencies provides a universal joint with completely unsatisfactory operating characteristics. Although the use of close tolerances during manufacturing for the inter-fit between each cup shaped bearing race and its yoke arm prevents these deficiencies, the cost of machining, assembly and inspection during production are excessive. It would, therefore, be advantageous to provide a cup shaped bearing race and yoke arm structure which would provide a universal joint having good operating characteristics, but one which did not require extremely "tight" tolerances during manufacturing.

Accordingly, it is an object of this invention to provide a cup shaped bearing race and yoke arm assembly which does not require close inter-fitting tolerances therebetween for a properly operating universal joint.

It is an additional object of this invention to provide a cup shaped bearing race and yoke arm assembly that operates satisfactorily and has no misalignment to occasion undue wear on the cup shaped bearing race, journal cross arm trunninon or needle bearings disposed therebetween.

It is a still further object of this invention to provide a cup shaped bearing race and yoke arm assembly which will prevent the cup shaped bearing race from rotating within the yoke arm after a period of use of the universal joint.

It is another object of this invention to provide a cup shaped bearing race and yoke arm assembly wherein the needle bearings of the assembly are free to rotate relative to the trunnion portion of the journal cross.

It is an additional object of the invention to provide a cup shaped bearing race and yoke arm assembly which utilizes a two piece yoke arm for ease in manufacturing assembly.

It is a still further object of this invention to provide a resilient means which, on assembly, both expands and compresses between the cup shaped bearing race and yoke arm so as to provide a tight bond therebetween and eliminate the requirements for extremely close tolerances of these parts.

It is another object of this invention to provide both a resilient and metal-to-metal contact between the bearing race and yoke arm to insure a positive assembly of them.

Other and further objects of this invention and its details will be apparent to those skilled in the art from the following detailed description and the appended drawings. It will, of course, be understood by reference to the accompanying drawings that they are offered only as an illustration of a preferred embodiment of the invention and what is now considered to be the best mode of applying the above principles.

In a preferred embodiment of the invention a cup shaped bearing race member is positioned over the radially outer end or trunnion portion of a journal cross arm member. An annulus of needle bearings is disposed within the cup shaped bearing race member and between it and the trunnion portion of the journal cross arm. The cup shaped bearing race member has an annular groove extending circumferentially around its outer periphery so as to receive a urethane ring within it. This urethane ring has a thickness which has a greater dimension than the depth of the annular groove and a width which is of lesser dimension than the width of the annular groove. The urethane ring is assembled in the groove in the cup shaped bearing race member and then these two elements are assembled to a split yoke arm, an outer portion of the split yoke arm being boltingly attached to an inner portion of the yoke arm with the cup shaped bearing race and urethane ring being disposed therebetween. As the two portions of the yoke arm are screwed tightly together a face to face, metal-to-metal contact is obtained between them and the urethane ring is compressed in thickness so as to expand in width to abut against the sides of the annular groove in the cup shaped bearing race. A pair of reliefs are provided, one in each of the opposite parts of the split yoke arm, these reliefs being disposed diametrically opposite one another so that compression of the urethane ring begins first on those segments of the split yoke arms immediately adjacent the reliefs to assure that there is some metal-to-metal contact between the cup shaped bearing race and yoke arm parts at these locations upon final compression of the urethane ring.

Figure 2:
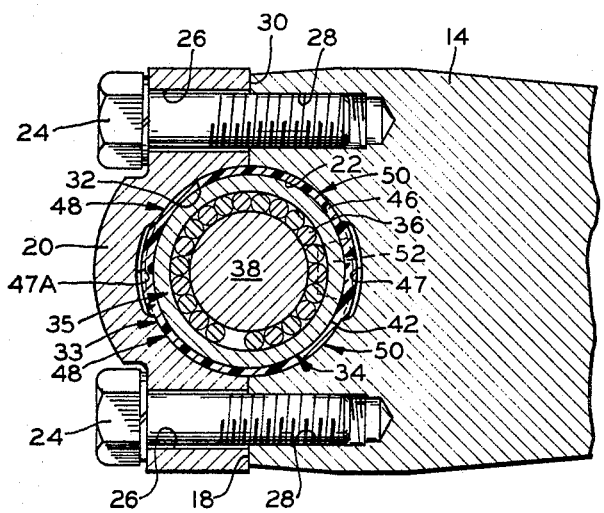
Figure 4:
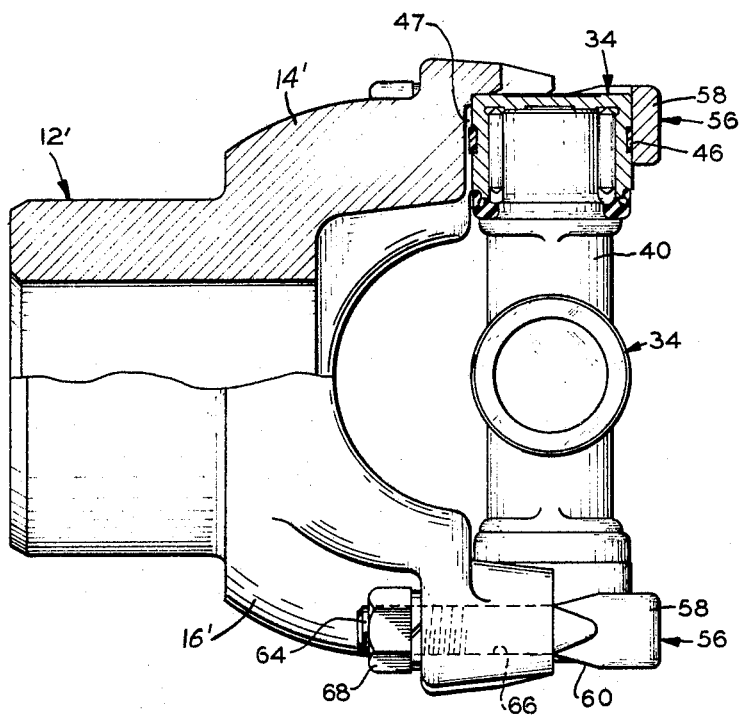
Figure 3:
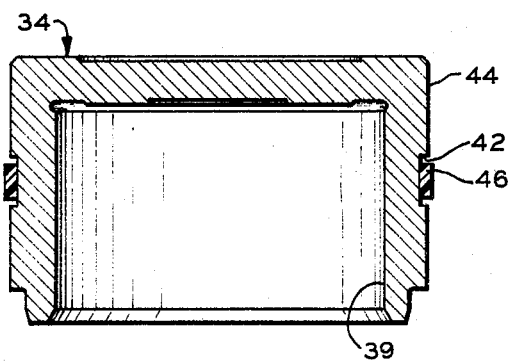

In the drawings:
FIGURE 1 is a longitudinal view of the assembly of one of the rotatable members of a Cardan-type universal joint to its journal cross arm with portions thereof cut away to add clarity to the showing;
FIGURE 2 is a view of the same assembly taken on line 2—2 of FIGURE 1;

FIGURE 3 is a view in elevation of the cup shaped bearing race member and assembled elastomeric ring member; and FIGURE 4 is a view similar to FIGURE 1 of another embodiment of the invention.

Referring now to the drawings, and more specifically to FIGURE 1, a portion of a universal joint 10 is shown including a rotatable member 12 which serves as the driving or driven member of the universal joint 10. A pair of yoke arm portions 14, 16, integral with the rotatable member 12, extend axially outwardly from a main body portion 15 thereof, above and below the axis of the rotatable member 12. Each of the yoke arm portions 14, 16 extend in axially aligned relationship and terminate in a pair of flat faces 18, 18 that form a convenient abutting means for a bearing race cap 20, the said flat faces 18, 18 being disposed in the same vertical plane for this purpose. Formed in each of the yoke arm portions 14, 16 of the rotatable member 12 is a semicircular bore portion 22 (only one shown) that extend vertically and perpendicular to the axis of the rotatable member 12.

Each of the bearing race caps 20 is boltingly attached to one of the yoke arm portions 14, 16 by a pair of bolts 24, 24 that extend axially thereof, through a pair of horizontally extending smooth bores 26, 26 formed in each bearing race cap 20. The bolts 24, 24 are then threaded into bores 28, 28 provided in the corresponding yoke arm portions 14, 16. Each of the bores 26, 26 is, of course, axially aligned with its respective corresponding bore 28, 28 so that the bearing race cap 20 may be successfully placed in assembled relation with its corresponding yoke arm portion 14 or 16. The bearing race cap 20 has a pair of flat faces 30, 30 similar to and corresponding to the flat faces 18, 18 formed on the yoke arm portions 14, 16 to provide abutting surfaces with which the flat faces 18, 18 of the yoke arm portions 14 or 16 abuttingly engage when the bearing race cap 20 is screwed tightly against the yoke portions 14, 16 of the rotatable member 12. Thus, a secure and aligned assembly is provided between the bearing cap races 20, 20 and yoke arm portions 14, 16.

Similarly to the semicircular bore portion 22, a semicircular bore portion 32 is formed in the bearing race cap 20 so as to extend vertically thereof and generally perpendicular to the axes of the rotatable member 12. The semicircular bore portion 32 conformingly mates with the respective semicircular bore portion 22 of the yoke arm portion 14 or 16 when they are in assembled relation so as to form a substantially uniform vertically extending circular bore 33 (which will be described in detail later) and, in which, is mounted a bearing race member 34.

The bearing race member 34 is generally cup shaped to thereby form an open, cylindrical, thin walled vessel formed by a circular and vertically extending wall 44 including a bottom 45 so as to provide a receiving chamber for easy and sure retention of a bearing means 35 rotatable relative thereto. Such bearing means includes a series or annulus 36 of needle bearings and a trunnion portion 38 integral with and a portion of a journal cross arm 40. The annulus 36 of needle bearings, as is conventional, is disposed in surrounding relationship relative to the cylindrical shape of the trunnion portion 38 and positioned between it and an internal cylindrical peripheral surface 39 of the cup shaped bearing race member 34.

In order to insure proper alignment and assembly of the cup shaped bearing race member 34 within the circular bore 33, a circumferentially extending groove means 42 is formed substantially intermediate the height of the wall 44 of the cup shaped bearing race member 34. The groove means 42 is rectangular in cross section and substantially greater in width than in depth (the purpose of this dimensioning to appear later) and uniform in cross section for the entire length of its circular extent. Disposed within the groove means 42 is a deformable elastomeric member or ring 46 made of urethane, rubber or the like. Preferably such a ring is preformed from urethane having a Shore type D durometer hardness in the general range of from 40 to 80 and a minimum tensile strength of 8000 p.s.i.; such a urethane material is manufactured under the trade name of Cyanaprene D-7 and sold by the American Cyanamid Company. Other ring materials, such as rings of hard rubber and other resilient plastics have also been utilized, but the resulting universal joint structure has not proved as satisfactory as a universal joint structure in which the above described urethane has been provided.

The elastomeric ring 46, in uncompressed condition (FIG. 3), has a thickness of larger dimension than the depth of the groove means 42 and a width of lesser dimension than the width of the groove means 42 so that the elastomeric ring 46 extends outwardly of the groove means 42 while fitting loosely therein. In assembled condition (FIGS. 1 and 2) the ring means 46 is compressed in thickness and expanded in width to substantially fill the groove means 42 to provide a high friction bond between the cup shaped bearing race member 34, bearing race cap 20 and yoke arm portion 14 or 16. As set out above, the groove means 42 is intermediate the height of the wall 44, this places the elastomeric ring 46 at the center of the torque zone (mediate the length of the annulus of needle bearings 36) and thereby provides a self alignment feature for the bearing assembly arrangement.

Upon assembly, in order to provide the proper compressive forces for the ring means 46 and to provide for slightly misalignment or slight differences in diameter between the formed bore portions 22 and 32, the bore 33 is provided with a pair of oppositely disposed reliefs 47, 47A. The relief 47A extends vertically for the entire axial extent of the bore 33 while the relief 47 extends axially along a major portion of the length of the bore 33. Because these reliefs are diametrically opposed a metal-to-metal contact of the bearing race cap member 20 and the cup shaped bearing race member 34 at the general peripheral surfaces indicated 48 and 50 occurs when these two elements are held in tightly assembled relation. Such contact is desirable to provide a more tightly held together and rigidified assembly than afforded by the frictional bonding afforded by the elastomeric ring 46 alone.

The assembly of the trunnion portion 38 to the yoke arm portion 14 or 16 is completed by a seal means 54 which abuttingly and sealingly engages the open end of the cup shaped bearing race 34 and the trunnion portion 38 to prevent the escape of lubricant from therebetween and to prevent the intrusion of dirt or dust into the area of the trunnion portion 38 adjacent the annulus 36 of needle bearings.

The cup shaped bearing race 34, journal arm member 40, yoke arm portions 14, 16 and included parts are placed in assembled relationship in the following manner. The ring means 46 is placed in the circumferential groove 42 of the cup shaped bearing race member 34 to form a subassembly and the seal means 54 is placed in position on the trunnion portion 38 to form a subassembly. The cup shaped bearing race member 34 and assembly ring means 46 is then placed over the trunnion portion 38 and the seal means 54 is engaged with the cup shaped bearing race member 34 at each trunnion portion 38. The journal cross arm 40 with mounted cup shaped bearing race members is then placed in the bore portions 22, 22 of the yoke arm portions 14, 16 so that the ends of the cup shaped bearing race members engage a pair of shoulders 52, 52 formed on each of the yoke arm portions 14, 16 axially outwardly of the reliefs 47, 47, the said shoulders limiting movement of this subassembly upwardly and downwardly relative to the axis of the rotatable member 12. A bearing race cap 20 is then placed around each of the cup shaped bearing race members 34 and the bolts 24 threadingly inserted into threaded bores 28. The bolts 24, 24 are tightened until the flat faces 18, 18 of the rotatable member 12 abuts tightly against the flat faces 30, 30 of the bearing race cap 20. During this tightening operation of the ring means 43 is compressed in thickness and the urethane material flows axially (relative to the axis of the trunnion portion 40) so as to fill the width of the circumferential groove means 42. Thus, a tight frictional seal is provided between the cup shaped bearing race member 34, bearing race cap 20 and rotatable member 12. At the same time, the reliefs 47 insure that the first contact occasioned between the bearing race cap 20 and the ring means 46 is at the peripheral surfaces located at 48 and 50 so that initial compression of the ring means 46 occurs at this point. Thus, the ring means 46, at this location is compressed first and also to a greater degree than the ring means 46 around the rest of its periphery. Final tight abutment of the flat faces 18, 18 and the faces 30, 30, then, insures that a metal-to-metal contact is obtained at the peripheral surfaces located at 48 and 50 to insure an even more positive engagement between the bearing race cap 20 and cup shaped bearing race member 34.

An indication of the tolerances which may be satisfactorily used in the practice of the instant invention are and the tolerances which must be used for an equivalent bore of a prior art universal joint will serve to illustrate how the practice of the instant invention provides a much more easily manufactured universal joint.

The instant invention:

Nominal diameter of bore 33—3″
Actual diameter of bore 33—3.061″—3.069″ (.008″)
O.D. of bearing race 34—3.0620″—3.0625″ (.0005″)

A prior art device without ring means 46:

Nominal diameter of bore 33—3″
Actual diameter of bore 33—3.0606″—3.0636″ (.003″)
O.D. of bearing race 34—3.0620″—3.0625″ (.0005″)

An alternate embodiment of the invention is shown most particularly in FIGURE 4 at 10″ wherein a U-bolt 56 is utilized with a rotatable member 12′ to hold the cup shaped bearing race 34 in assembled relation. The U-bolt 56 thereby replaces the bearing race cap 20 in this embodiment of the invention.

The U-bolt 56 is generally conventional, but includes a semicircular band portion 58 of greater width than the remainder of the U-bolt. This band portion, because of its greater width, provides sufficient bearing area to hold and compress the cup shaped bearing race 34 and elastomeric ring member 46 in proper assembled relationship to form a satisfactory bond therebetween for universal joints of the smaller sizes. U-bolt 56 includes angled portions 60 (only one shown) formed at the opposite ends of the band portion 58 so as to provide a smooth transition between the band portion 58 and a pair of threaded portions 64, forming the legs of the U-shape of the U-bolt 56. The threaded portions 64 extend through non-threaded bores 66 formed in a pair of yoke arm portions 14′ and 16′ of the rotatable member 12′ so as to be easily attached to nuts 68. The nuts 68, of course, urge the U-bolt 56 into tight assembled and conforming relationship with the cup shaped bearing race 34, a certain predetermined torque being provided to tighten the nuts 68 to insure proper compression and expansion of the elastomeric ring member 46.

No relief is provided at the U-bolt 56, but a relief 47 is included in each of the yoke arm portions 14′ and 16′ so that metal-to-metal contact is still obtained between the cup shaped bearing race 34, yoke arm portions 14′ and 16′ and the U-bolt 56.

It should be clear from the foregoing, that the remainder of the description of the second embodiment of the invention is similar to the description provided for the first embodiment of the invention and that the structure of the second embodiment of the invention provides similar advantages to those afforded by the first embodiment for universal joints of smaller sizes.

It is to be understood that the foregoing disclosure is merely illustrative of the preferred embodiments of the invention and that the scope of the same is not to be limited thereby, but is to be determined by the appended claims.

What is claimed is:

1. In a journal cross arm and bearing assembly: (a) a yoke member having spaced apart yoke arm portions, (b) a semicircular bore means formed at the outer ends of the yoke arm portions, (c) a journal cross, (d) trunnions on said journal cross, (e) annular bearing race means having annular groove means disposed in the peripheral portions thereof rotatably mounted on said trunnion and positioned in said semicircular bore means, (f) fastening means engaging a portion of said annular bearing race means for securing the bearing race means within said semicircular bore means, (g) a compressible locking member positioned in said annular groove means, (h) said compressible locking member, in uncompressed condition, having, (1) a thickness greater than the depth of the annular groove means, (2) a width less than the width of said annular groove means, (i) said compressible locking member, in assembled position, engaging a portion of said semicircular bore means and a portion of said fastening means so that said compressible locking member is in compressed condition thereby filling the annular groove means and locking the annular bearing race means with respect to the semicircular bore means.

2. The combination set out in claim 1 wherein relief means are provided in said yoke arm portions whereby at least point-to-point contact is obtained between said annular bearing race means and said yoke arm portions and said annular bearing race means and said fastening means.

3. The combination set out in claim 2 wherein said fastening means comprising a U-bolt removably attached to said yoke member.

4. The combination set out in claim 2 wherein said fastening means comprises a bearing cap member and bolt means attaching said bearing cap member to said yoke member.

5. A trunnion and yoke arm assembly comprising; (a) a yoke member having axially extending arms, (b) radially extending aligned openings in the arms of said yoke member, (c) a journal cross having radially extending trunnions in paired opposed relationship, (d) bearing means rotatably mounted on at least a pair of said trunnions and adapted to be received in the openings in the arms of said yoke member, (e) resilient ring means disposed between said bearing means and in said aligned openings, (f) annular groove means extending around the periphery of said bearing means, (g) said resilient ring means being preassembled in said annular groove, (h) said resilient ring means, in preassembled condition, being of greater thickness than the depth of said annular groove means and being of lesser width than the width of said annular groove means, (i) fastening means for assembling said bearing means to said yoke member and for compressing said ring means to substantially fill said annular groove means whereby said yoke member fastening means and bearing means are lockingly disposed in assembled relationship.

6. The combination set out in claim 5 wherein shoulder means are provided on said yoke member to limit outward movement of said journal cross and bearing means.

7. A yoke arm and trunnion assembly comprising; (a) a yoke arm portion, (b) a semicircular bore portion disposed in the outer end of said yoke arm portion and opening outwardly, (c) a trunnion portion, (d) a cup shaped bearing race disposed in said semicircular bore, (e) a fastening means disposed around said cup shaped bearing race, (f) a compressible annular ring like locking member positioned in a groove means disposed in said cup shaped bearing race, (g) said ring like locking member in non-compressed condition having a thickness greater than the depth of said groove and a width less than the width of said groove, (h) said ring like locking member being compressed by said fastening means so as to decrease in thickness and increase in width to substantially fill said groove whereby said yoke arm portion is securely held to said cup shaped bearing race.

8. The combination set out in claim 7 wherein said yoke arm portion is provided with a lug like portion to prevent outward movement of said cup shaped bearing race.

9. The combination set out in claim 8 wherein a relief is provided in said yoke arm portion and a relief is provided in said fastening means whereby at least a portion of the surface of said cup shaped bearing means abuts against a portion of the surface of said semicircular bore and a portion of said surface of said fastening means.

10. The combination set out in claim 9 wherein said fastening means comprises a bearing cap member attached to said yoke arm portion.

11. The combination set out in claim 9 wherein a sealing means abuttingly and sealingly engages said trunnion portion and said cup shaped bearing race.

12. The combination set out in claim 8 wherein a relief means is provided between said cup shaped bearing race and said yoke arm portion.

13. The combination set out in claim 11 wherein said fastening means comprises a U-bolt element.

14. The combination set out in claim 8 wherein said resilient ring means is disposed mediate the height of said bearing means to provide self alignment of the assembly.

References Cited

UNITED STATES PATENTS

| | | | |
|---|---|---|---|
| 2,228,715 | 1/1941 | Wollner | 64—17 |
| 2,473,267 | 6/1949 | Wightman | 308—236 |
| 2,650,866 | 9/1953 | Knudson | 308—236 |
| 3,145,547 | 8/1964 | Lyons | 64—17 |

HALL C. COE, Primary Examiner

U.S. Cl. X.R.
308—236